Oct. 25, 1932.  E. O. BENNETT  1,885,046
FLEXIBLE STUFFING BOX ASSEMBLY
Filed Nov. 5, 1931
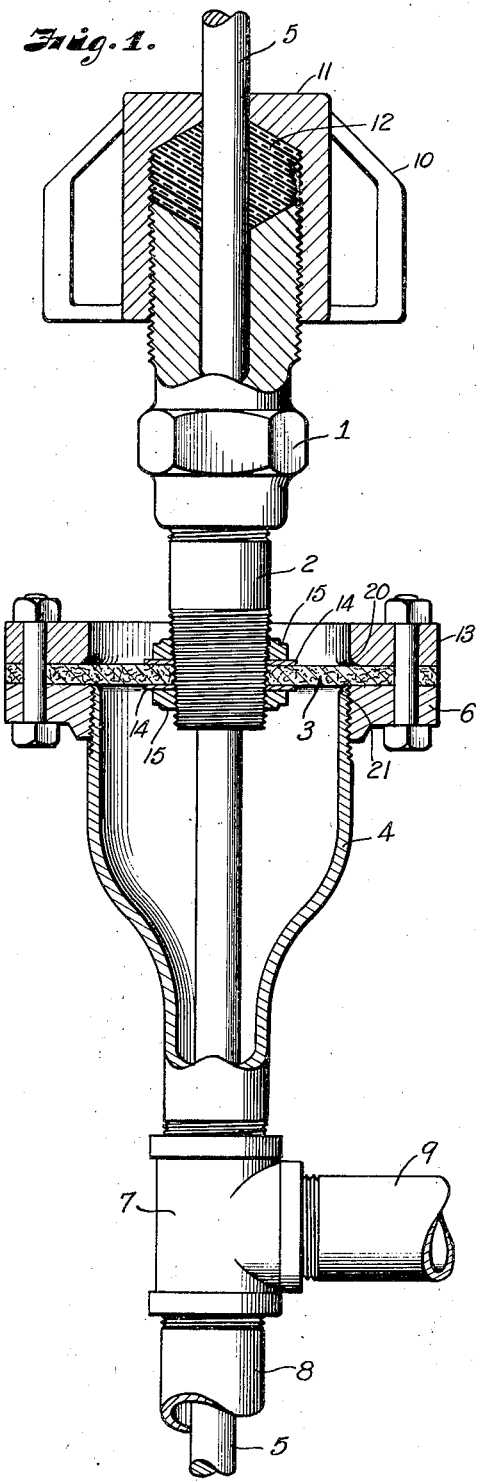
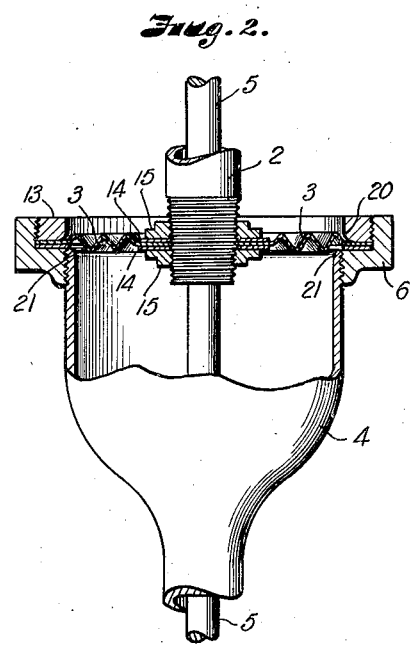
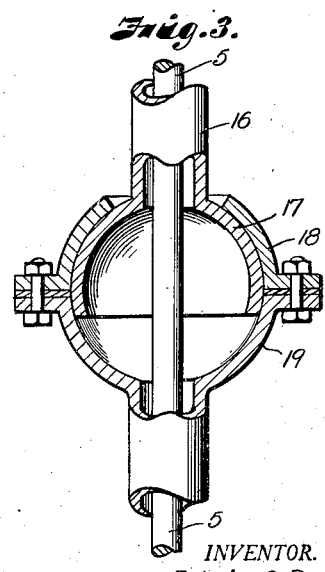
INVENTOR.
Edwin O. Bennett
BY Thos. E. Scofield
ATTORNEY.

Patented Oct. 25, 1932

1,885,046

UNITED STATES PATENT OFFICE

EDWIN O. BENNETT, OF PONCA CITY, OKLAHOMA, ASSIGNOR TO CONTINENTAL OIL COMPANY, OF PONCA CITY, OKLAHOMA, A CORPORATION OF DELAWARE

FLEXIBLE STUFFING BOX ASSEMBLY

Application filed November 5, 1931. Serial No. 573,087.

My invention relates to a flexible stuffing box assembly, and more particularly to an assembly whereby the stuffing box around the pump rod in a pumping oil well is rendered tight.

The sucker rod in a pumping well is given reciprocating motion by a walking beam. In a transmission of this nature the reciprocating rod undergoes an oscillating or angular motion in addition to its reciprocation. This angular motion works the packing in the stuffing box loose and it soon becomes badly worn on one side or the other, depending upon the direction of the angular motion. When this occurs it begins to leak and both oil and gas escape from the well, producing a fire hazard.

One object of my invention is to provide a stuffing box wherein that portion containing the packing is self-aligning.

Another object of my invention is to provide a stuffing box assembly wherein the packing is flexibly mounted in order to preclude wear due to the angular motion of the reciprocating rod.

A further object of my invention is to provide an assembly wherein wear on the pumping rod will be eliminated.

Other objects will appear from the following description.

Fig. 1 shows a sectional elevation of an assembly embodying one mode of carrying out my invention.

Fig. 2 is a fractional view showing a modification embodying my invention.

Fig. 3 shows another mode of carrying out my invention.

In general, my invention contemplates a stuffing box which is flexibly mounted so that it will be self-aligning and will form a perfect packing in spite of slight oscillatory movements of the reciprocating rod.

More particularly, referring now to the drawing in which like reference numerals will be used to indicate like parts in the various views, the pump rod 5 is given reciprocating motion by the customary walking beam (not shown). Around the pump rod 5 is a stuffing box 10 having the conventional parts 1 and 11 for compressing packing 12 around the pump rod 5. It is to be remembered that any type of stuffing box may be used without departing from the spirit of my invention.

A swedge nipple 4 is secured to the T 7 at the top of the well casing 8. Line 9 running from the side of the T conducts the oil to the storage tank. A flange 6 is screwed around the top of the swedge nipple 4. Between flange 6 and a holding flange 13 is secured a flexible diaphragm 3, made of heavy oil field belting or other suitable flexible material of sufficient strength to withstand the pressure within the well. Positioned centrally in flexible diaphragm 3 is secured nipple 2 which is rigidly connected to the stuffing box. The nipple 2 may be secured to the flexible diaphragm 3 by washers 14 held in place by lock nuts 15. The particular manner of securing the stuffing box to the flexible diaphragm may be varied without departing from the spirit of my invention.

It will now be readily appreciated that any oscillatory or angular motion of the sucker rod 5 will be taken up by the flexible diaphragm 3 which permits the stuffing box to maintain perfect alignment with the sucker rod for any and all positions it might take, thereby eliminating substantially the lateral thrust and hence the lateral wear on the stuffing box and the packing. Inasmuch as it was this lateral wear which occasioned the leakage, it will be seen that I have accomplished the objects of my invention.

In the modification shown in Fig. 2, I have employed a corrugated flexible metal diaphragm instead of the flexible fabric diaphragm used in modification shown in Fig. 1.

In the modification shown in Fig. 3, I have shown another means of effecting a flexible joint in which the member 16 is substituted for the member 2 and terminates in a hemispherical portion 17. The swedge nipple 4 is replaced by a pair of flange members 18 and 19, as shown in the drawing. It will be readily appreciated that the member 16 may partake of angular motion to permit the stuffing box to align itself with the sucker rod 5 in the same manner as done in the modifications of Figs. 1 and 2.

It is to be noted in the forms shown in Figs.

1 and 2 that fillets 20 and 21 are provided to prevent the cutting of the diaphragm.

It will be understood that certain features and subcombinations are of utility and may be employed without reference to other features and sub-combinations. This is contemplated and is within the scope of my claims. It is further obvious that various changes may be made in details without departing from the spirit of my invention within the scope of my claims. It is, therefore, to be understood that my invention is not to be limited to the specific details shown and described.

Having thus described my invention, what I claim is:

1. Means for mounting a stuffing box for a well pump rod comprising a nipple having an enlarged portion, said nipple being secured to the well casing, a relatively thin annular disk extending across said nipple and fixedly attached thereto, a stuffing box secured to said disk and supported solely thereby, the arrangement being such as to provide for a slight angular movement of said stuffing box to accommodate it to movements occasioned by pumping operations.

2. A stuffing box supporting means as in claim 1 in which said supporting disk comprises an oil resistant material possessing rigidity against a force acting in the plane of the disk and flexible in response to a force acting at an angle to the plane of the disk whereby the stuffing box is permitted to partake of a degree of angular movement while held against lateral motion.

3. A stuffing box supporting means as in claim 1 wherein said disk comprises oil field belting.

In testimony whereof I affix my signature.

EDWIN O. BENNETT.